United States Patent [19]

Satake et al.

[11] Patent Number: 5,393,443
[45] Date of Patent: Feb. 28, 1995

[54] HARD-COATING, HEAT-ABSORBING COMPOSITION AND HEAT-SHIELDING SUBSTANCE

[75] Inventors: Toshimi Satake; Tomoaki Nagai; Miyuki Yokoyama, all of Tokyo, Japan

[73] Assignee: Jujo Paper Co., Ltd., Tokyo, Japan

[21] Appl. No.: 898,288

[22] Filed: Jun. 15, 1992

[30] Foreign Application Priority Data

Jun. 19, 1991 [JP] Japan .................. 3-146434

[51] Int. Cl.⁶ .................................... C04B 43/02
[52] U.S. Cl. ........................ 252/62; 427/161; 427/167; 427/387; 252/182.3; 556/400
[58] Field of Search ............... 252/62, 182.3; 427/387, 427/167, 161; 556/400

[56] References Cited

U.S. PATENT DOCUMENTS 4,496,469  1/1985  Morimoto et al. ............ 252/62
5,069,942 12/1991  Anderson ..................... 427/387

FOREIGN PATENT DOCUMENTS 0420233  9/1990  European Pat. Off. .
0420233  4/1991  European Pat. Off. .
1250056 11/1986  Japan .

*Primary Examiner*—Paul Lieberman
*Assistant Examiner*—Necholus Ogden
*Attorney, Agent, or Firm*—Burgess, Ryan & Wayne

[57] ABSTRACT

A hard-coating, heat-absorbing composition which is capable of absorbing near-infrared rays from sunlight and a heat-shielding substance is disclosed. The composition comprises a silicone varnish for hard-coating comprising polysiloxane and, dissolved therein, diphenylthiourea and copper monobutyl-o-phthalate. It can be applied to plastic substrate and heated to cure the silicone varnish, whereupon curing of polysiloxane and production of a heat-absorbing compound are simultaneously effected. The composition ensures to provide various substrates with a heat-shielding characteristic.

7 Claims, No Drawings

HARD-COATING, HEAT-ABSORBING COMPOSITION AND HEAT-SHIELDING SUBSTANCE

BACKGROUND OF THE INVENTION

1. Field of the Invention

The present invention relates to a composition for hard-coating for protecting a soft substrate surface as a glass-like material and to a heat-shielding substance which shields heat rays by absorption.

2. Description of the Background Art

Plastic materials are frequently used in place of glass, taking advantage of their excellent characteristics such as transparency, light weight, resistance to impact, ease of processing, and the like. They cannot, however, take place of glass depending on the applications because of the reasons that the surfaces of the plastics are easily damaged, their resistance to chemicals is poor, and the like. In recent years, advances have been made in the technology of hard coatings applied to the surfaces of general-purpose engineering plastics, such as polymethylmethacrylate resins (hereinafter referred to as PMMA), polycarbonate resins (hereinafter referred to as PC), and the like, to provide major improvements in scratch resistance and chemical resistance, so that large amounts of these materials are now being used in the fields of optical parts, automotive parts, electrical appliances, building materials, and the like, where glass has conventionally been used.

Examples of materials used for hard-coating plastics include organic resin coating materials such as urethane resins, melamine resins, acrylic resins and the like, and inorganic coating materials such as organic silicates, silicone resins, metal oxides and the like. Of these, organic ultraviolet-curable acrylic resins and inorganic heat-curable silicone resins are used industrially.

Acrylic resins are superior from the aspects of economics and productivity, but are inferior to silicone resins in surface hardness and weather resistance. At the present time, silicone resins are the main group being used as hard-coating materials. A number of trials are being undertaken for providing silicone-type hard-coating compositions with functions such as anti-fogging, antistatistic, photosensitivity, semiconductance, antireflection, and dielectric characteristics, in addition to their inherent functions of protecting the surfaces of plastic materials. These additional functions can be obtained by dissolving or dispersing in the hard-coating composition chemicals which are capable of providing such functions.

A hard-coating composition of silicone resin type containing a photochromic compound has been proposed as a hard-coating material having light shielding characteristics. In this type of composition the degree of sunlight-shielding is controlled by the change in the color density proportional to the amount of light. The composition is expected to have application in sun glasses, window materials, and the like. However, its capability of shielding heat rays, particularly near-infrared rays, among sunlights is insufficient. In addition, photochromic compounds generally deteriorate by light and tend to lose their functions over time. They also change color through photodecomposition. Thus, their durability is inadequate.

Up to now, no hard-coating composition providing heat-shielding effects by the efficient absorption of near-infrared rays from sunlight has been developed.

On the other hand, a solar heat shielding film is known as a shielding material which shields heat rays from the sun by absorption or reflection. This type of film has a polyester film as a substrate to which an adhesive is applied to provide the function of preventing broken glass from flying and scattering, and on top of this adhesive layer, a colorant layer or a thin-film layer of aluminum or special metal is produced by vacuum evaporation to provide a heat shield function.

The colorant layer which is colored by a glazing dye, however, cannot absorb heat rays, i.e., near-infrared rays. An attempt to provide a sufficient heat shielding function to this type of film results in shutting out also visible lights, posing a problem of making the inside room dark.

Since a unit provided with a metal layer by vacuum evaporation exhibits high reflection of lights in near-infrared and visible region, it entails the environmental problem of a troublesome glare illuminating the surrounding area due to the reflected light, even though it has good heat-shielding characteristics. Another problem is its low percent transmission for visible light, which makes inside rooms dark. In addition, constructing multiple layers, including providing a metal layer by vacuum evaporation and forming a protective layer on top of the metal layer, requires much time and trouble with the attendant problem of high cost.

In Japanese Patent Laid-open (ko-kai) No. 3493/1990, a methods is disclosed for shielding solar heat rays by absorption by homogeneously dispersing a near-infrared absorbing composition directly into a plastic. However, for obtaining a thin film heat-shielding substance with a thickness of, e.g., about 100 μm, the near-infrared absorbing composition must be used in a plastic in a large proportion. This can be achieved only by the sacrifice for visible light transmission, characteristics of films such as the film strength, the fluidity of the plastic required for the injection molding, and the like. Thus, no heat-shielding thin film with sufficient characteristics required in practical use can be obtained by this method.

Accordingly, an object of the present invention is to provide, with due consideration to the drawbacks of such conventional hard-coating compositions, a heat ray shielding substance having both functions of protecting a soft substrate surface and of shielding heat rays with long term stability and excellent efficiency and, at the same time, exhibiting high percent transmission for daylight (visible light) with low surface reflection, and a hard-coating composition for producing such a heat ray shielding substance.

Since the heat rays are mainly in the form of light from the near-infrared region, the inventors of the present invention studied incorporation of a near-infrared absorbing dye into a hard-coating composition in achieving the above objects. Near-infrared absorbing dyes which find application as an optical recording material using a semiconductor laser beam have been developed and various types of such dyes are available on the market. However, since these near-infrared absorbing dyes exhibit the absorption peak at a specific wave length in the near-infrared region, their effectiveness for shielding the entire heat rays is insufficient. Many of those having rather strong absorption in the visible range are intensely colored. In this respect, too, no suitable composition has yet been discovered. In addition, these dyes have insufficient heat resistance, their performance tends to deteriorate at curing temperatures, or their near-infrared absorption capability reduces over time. Furthermore, the poor solubility of the dyes causes them to deposit as time passes, making it impossible to obtain a transparent hard-coat layer. Thus, a satisfactory solution to the problems of the present invention was very difficult with these types of near-infrared absorbing dyes.

As a result of further painstaking research, the present inventors found that the object of the present invention could be achieved by the combined use of a derivative of thiourea and a copper salt of an organic acid, without directly using a near-infrared absorbing dye.

SUMMARY OF THE INVENTION

Accordingly, an object of the present invention is to provide a heat ray shielding substance having both functions of protecting a plastic surface and of shielding heat rays with long term stability and excellent efficiency and, at the same time, exhibiting high percent transmission for daylight with low surface reflection, and further to provide a hard-coating composition for producing such a heat ray shielding substance.

The above object of the present invention is achieved according to the present invention by the provision of a hard-coating heat-absorbing composition comprising polysiloxane; a derivative of thiourea represented by the following formula (1),

$$R_1\text{-NH-CS-NH-}R_2 \quad (1)$$

wherein $R_1$ and $R_2$ independently represent hydrogen, an alkyl group, aryl group, aralkyl group, alkenyl group, or 5-or 6-membered cyclic residual group, having 1–22 carbon atoms, wherein each group may have one or more substitute groups selected from alkyl, aryl, aralkyl, and alkenyl groups having 1–10 carbon atoms, nitro group, halogen, hydroxyl group, and amino group; and a copper salt of organic acid.

More specifically, the above object can be achieved by the provision of a hard-coating heat-absorbing composition comprises (A) a solution in which polysiloxane and said derivative of thiourea are homogeneously dissolved and (B) a solution in which polysiloxane and a copper salt of an organic acid are homogeneously dissolved.

Another object of the present invention can be achieved by the provision of a heat-shielding substance comprising an organic synthetic polymer or copolymer substrate and a heat-absorbing hard-coating layer which is formed on said substrate by applying and curing with heat said hard-coating heat-absorbing composition.

Furthermore, the above object of the present invention can be achieved by the provision of a heat-shielding substance comprising a substrate, a metal layer formed by vacuum evaporation of a metal on the surface of said substrate, and a heat-absorbing hard-coating layer formed on the top of said metal layer by applying and curing with heat said hard-coating heat-absorbing composition.

Other and further objects, features and advantages of the present invention will appear more fully from the following description.

DETAILED DESCRIPTION OF THE INVENTION AND PREFERRED EMBODIMENTS

As a method of obtaining a hard-coat film and a hard coating composition for which the main hard-coating component is polysiloxane, a sol-gel method discovered in 1971 by H. Dislish is generally applied. This method comprises forming a glass-like material through a sol-gel process using a solution as a raw material. The hard-coating composition and hard-coat layer of the present invention can also be obtained by utilizing this method.

The hard-coating composition is a sol prepared by hydrolyzing or partially condensing organoalkoxysilane monomers of mainly ternary-function and quaternery-function in the presence of a solvent and an acid or a base to obtain a polysiloxane, dissolving the polysiloxane in a solvent such as alcohol, cellosolve, ketone, or the like, adding a curing catalyst, and further dissolving various types of additives depending on the required functions.

When a large amount of quaternery-functional units are present, the sol becomes hard and tends to produce cracks. Introduction of bi-functional monomers provides flexibility, but tends to lower the hardness. The use of colloidal silica as the quaternery-functional unit can promote both flexibility and hardness at the same time.

To obtain a hard-coat film, this sol is caused to adhere to a soft surface of a substrate such as the plastic or the like to be protected by application, immersion or the like, and heated to harden the sol into a gel. Heating polysiloxane makes the silanol group to further condense making the molecular weight of polysiloxane even higher and producing a hardened glass-like surface. A sol without a catalyst requires a high temperature of 150° C. or higher and is thus applied to a hard-coating treatment of the surface of a soft metal such as aluminum. For the surface treatment of plastic materials such as PC and PMMA with a low thermal deformation temperature, a catalyst such as an acid, a base, an organometallic compound is used in order to carry out the hardening at a low temperature of 150° C. or lower conforming to the heat resistance of the substrate.

For example, in the case of a hard-coating composition used for diethylene glycol bisallyl carbonate resin, a polysiloxane containing an epoxy group is effective. This type of composition can be hardened, after being adhered to a substrate, at a temperature near the ambient temperature, by using a curing agent such as an alkoxide or a chelated compound of Al, Ti, Fe, Cr or the like, a peroxide, a Lewis acid, plutinum, or the like. In particular, a chelated aluminum a preferable catalyst to accelerate both the ring-opening polymerization of an epoxy group and the condensation of a silanol group.

A polysiloxane used in the hard coating composition of the present invention is a mixture of polysiloxanes represented by the formula, $(R_aSiO)_n$, wherein R is a substituted or unsubstituted monovalent hydrocarbon group and a is a number from 1.90 to 2.05. Those with the molecular chain terminals sealed by a hydroxyl group or two or three alkoxy groups are preferable.

Examples of R include $C_{1-10}$ alkyl groups, such as methyl group, ethyl group, propyl group, butyl group, 2-ethylbutyl group, octyl group, and the like; $C_{5-8}$ cycloalkyl groups such as cyclohexyl group, cyclopentyl group, and the like; alkenyl groups such as vinyl group, allyl group, hexenyl group, and the like; aryl groups such as phenyl group, tolyl group, xylyl group, naphthyl group, and the like; arylbenzyl groups such as diphenyl group and the like; aralkyl groups with $C_{1-10}$ alkyl groups, such as phenylethyl group and the like; and these groups in which a part or all of the hydrogen atoms bonded to the carbon atoms are substituted by halogen atoms, cyano groups, or the like, such as chloromethyl group, trifluoropropyl group, 2-cyanoethyl group, 3-cyanopropyl group, and the like.

As thiourea compounds of the above-mentioned formula (1) to be added to a sol of which the major component is the above-mentioned polysiloxanes, those dissolvable in the solvent used in the hard-coating composition and capable of providing a compound with a light color or no color at all when reacted with another component, a copper salt of an organic acid, are suitably used. Of these, those having an aromatic ring in either one of 1- or 3-positions are particularly preferable due to their abundant solubility in a solvent used for the hard-coating composition. The following compounds can be given as specific examples.

Thiourea, 1-ethylthiourea, 1-phenylthiourea, 1-m-nitrophenylthiourea, 1-p-aminophenylthiourea, 1,1-diphenylthiourea, 1,3-dimethylthiourea, 1,3-dicyclohexylthiourea, 1,3-distearylthiourea, 1,3-dibehenylthiourea, 1,3-diphenylthiourea, 1,3-di-m-chlorophenylthiourea, 1,3-bis(2-hydroxyethyl)thiourea, 1-methyl-3-p-hydroxyphenylthiourea, 1-ethyl-3-phenylthiourea, 1-ethyl-3-p-chlorophenylthiourea, 1-ethyl-3-(2-hydroxyethyl)thiourea, 1-phenyl-3-p-chlorophenylthiourea, 1-phenyl-3-p-methoxyphenylthiourea, 1-p-hydroxyphenyl-3-phenylthiourea, 1-p-bromophenyl-3-phenylthiourea, 1-p-aminophenyl-3-phenylthiourea, 1-p-nitrophenyl-3-phenylthiourea, 1-(2-thiophenyl)-3-phenylthiourea, 1-(2-thiazolyl)-3-phenylthiourea, 1,1-dibenzyl-3-phenethyl-thiourea, ethylenthiourea, 1-benzyl-3-m-tolylthiourea, and 1-benzyl-3-m-chlorophenylthiourea.

As a copper salt of an organic acid used together with the thiourea derivative, those homogeneously dissolvable in a solvent for the hard-coating composition in a required amount and giving a pale color or no color when reacted with the thiourea derivative can be suitably used. Examples of such compounds include the following compounds.

Copper stearate, copper palmitate, copper oleate, copper laurate, copper benzoate, copper p-tolylate, copper p-tert-butylbenzoate, copper parachlorobenzoate, copper p-phenylbenzoate, copper o-benzoylbenzoate, copper p-nitrobenzoate, copper aminobenzoate, copper diethyldicarbamate, copper alkylbenzenesulfonate, copper p-toluenesulfonate, copper naphthalenesulfonate, copper dodecylbenzenesulfonate, copper monobutyl-o-phthalate, copper monobenzyl-o-phthalate, copper monophenyl-o-phthalate, copper monoamyl-o-phthalate, copper monopropyl-o-phthalate, copper monobutyl-m-phthalate, copper (meth)acryloyloxy-2-propylphthalate, copper (meth)acryloyloxyethylphthalate, copper (meth)acryloyloxy-2-butylphthalate, and copper (meth)acryloyloxy-2-acylphthalate, Among these compounds, the copper methacryloylphthalate and copper monophthalate as described in the specification for Japanese Patent Laid-open (ko-kai) No. 246256/1991 filed by the inventors of he present invention are particularly desirable due to their excellent solubility in solvents used for compositions for hard-coating, such as alcohol and cellosolve.

The above-mentioned thiourea compounds and copper salts of organic acid do not exhibit substantial infrared absorption or heat-absorption characteristics, if used alone or simply mixed or dissolved together. However, when thiourea derivatives and copper salts of organic acid are brought into coexistence almost hogeneously and heated to a temperature higher than 80° C., preferably 90° C. to 300° C., these compounds easily react producing a product with a small absorption of visible lights exhibiting only a pale color to the naked eye, but having strong absorption over a wide range in the near-infrared region. Since a hard-coating composition comprising polysiloxanes as a major component is usually cured at approximately the same temperature, the hard-coating composition containing these thiourea derivatives and copper salts of organic acid can be used under exactly the same conditions as in conventional methods and can provide a superior heat-absorbing hard-coating film.

The substrate for the heat-absorbing shield substance of the present invention may be any types of substrates requiring a silicone-type hard-coat and heat-absorbing surface, such as paper, thin paper, fiber, soft metal, victoria lawn, net, natural or synthetic resins, or the like. The substrate may be shaped as a film, cloth, sheet, board, or a memeber formed in a special shape. Taking the advantage of the special heat absorption shielding characteristics and transparency to visible light, particularly preferable substrates to which the composition of the present invention can be applied are transparent plastics such as polymethacrylic resin, polycarbonate resin, polyester resin, and the like.

The heat-absorbing shield substance of the present invention can be obtained by depositing a metal by vacuum evaporation on the surface of the above-mentioned substrate in advance, and by providing a heat-absorbing hard-coat film from the hard-coating material containing the hard-coating composition of the present invention on that metal. Such a heat-absorbing shield substance can exhibit an excellent heat ray shielding characteristic and, at the same time, can effectively suppress the glare by the reflection from the deposited metal layer.

The hard-coating composition of the present invention can be prepared by adding a thiourea compound and a copper salt of an organic acid to a commercially available silicone varnish used for hard-coating and dissolving them into the silicone varnish. A silicone resin dissolved in an organic solvent may also be used as the silicone varnish. The optimum amounts of the thiourea compound and the the copper salt of an organic acid are dependent on the object of use and can be appropriately determined by a test. Generally, a total of 5 to 50 parts by weight of the thiourea compound and the copper salt of an organic acid is added to 100 parts by weight (as solid) of the polysiloxane-type hard-coating material. The mol ratio of the copper compound and the thiourea derivative is preferably about 1:3 to 1:5.

The thiourea derivative compound and the copper salt of an organic acid may be dissolved in the silicone varnish at the same time, but since undissolved materials may deposit over time, it is desirable from the aspect of stability to separately prepare and store two solutions, i.e., the thiourea compound in the hard-coating silicone varnish and the copper salt of an organic acid in the hard-coating silicone varnish. When used, these two liquids are mixed together and applied to the substrate, or it may be possible to adhere the two solutions separately in layers.

When the above-mentioned two solutions are applied, both solutions are adhered to the substrate by first applying (A) a solution in which the thiourea derivative of formula (1) and polysiloxane are homogeneously dissolved and then applying (B) a solution in which the copper salt of organic acid and polysiloxane are homogeneously dissolved; or alternatively solution (B) is first applied and then solution (A) is applied. A heat-absorbing, hard-coating layer can be produced in the interface of the solutions by curing with heating.

In applying the heat-absorbing hard-coating composition of the present invention to the substrate, a normal painting or coating method such as flow-coating, spray-coating, dip-coating or the like can be used. After drying and setting, the composition is cured by heating to 80° C. or higher, resulting in a hard-coat layer with a heat-absorbing function on the surface of the substrate. Given as another method for providing a hard-coat film is a premold processing method in which a silicone resin is applied to a metal mold before molding, or a CFI method in which an advance hard-coating process is carried out on one side of a PC film and the coated PC film is then inserted into the mold for injection molding.

The determination as to the requirement of annealing or a primer, as well as selection of their types, are suitably made depending on the type of substrate used.

The thiourea derivative of formula (1) and the copper salt of an organic acid are dissolved in the silicone varnish or in a solvent for dissolving polysiloxane. At this point of time, they have no substantial near-infrared absorption function, and accordingly, no heat-shielding function. However, heating the composition after the application to the substrate or after the impregnation thereinto causes the polysiloxane to be further polymerized by condensation and hardens the polymer to form a glass-like material. At the same time, the thiourea derivative and the copper salt of an organic acid react to create a compound with strong near-infrared absorption characteristics over a wide range. Since the reaction products have little color in the visible region and involve no loss of transparency in the hard-coat layer, they can shield the heat by effectively absorbing the heat rays from the near-infrared region, in spite of their clearness, i.e., the high percent transmission of the light in the visible region. Since heat rays are absorbed in the hard-coat thin layers, the substrates hardly deform by heat, even when their heat resistance is rather weak.

Other features of the invention will become apparent in the course of the following description of the exemplary embodiments which are given for illustration of the invention and are not intended to be limiting thereof, in which "parts" as units designates "parts by weight".

EXAMPLES

The heat-absorbing hard-coating composition of the present invention was evaluated from performance of heat shield substances provided with a hard-coat layer. Those transmitting visible light and not transmitting near-infrared rays are deemed to have good heat shield performance. The evaluation was carried out according to the method of determination of percent transmission for daylight (visible light) and solar radiation as specified in JIS R 3106. The greater the percent transmission for daylight and the smaller the percent transmission for solar radiation, the better is the performance of the heat shield substance. In the actual measurements, a direct recording spectrophotometer, model U-4000 (trademark) manufactured by Hitachi, Ltd., and the applicable measurement program package were used to measure percent of spectroscopic transmission by the method specified in JIS R 3106. The percent transmission for daylight and solar radiation were calculated based on the results of the measurement.

As the criteria for performance evaluation, percent transmission for daylight and solar radiation was determined on a commercially available heat shield film, NR254B (trademark) manufactured by Sunshed Industries Ltd., with a thickness of 9 $\mu m$, using the above method. Percent transmission for daylight was 48% and that of the solar radiation was 57%.

Example 1

Twelve parts of diphenylthiourea and 6 parts of copper methacryloyloxyethylphthalate were dissolved in 476 parts of silicone varnish (Tosguard 510: trademark, manufactured by Toshiba Silicone Co., Ltd.; solid content 21%). to obtain a heat-absorbing hard-coating composition (liquid composition for near-infrared absorption). This composition was applied to a substrate of a 70 $\mu m$ polyester film using a Mayer bar and the solvent was volatilized at room temperature. After setting, the composition was cured by heating for two minutes in an oven at 150° C. to obtain a transparent, heat shield film with a light green color. The amount of the composition applied to the substrate was 8 gm/m$^2$.

Another composition was prepared in the same manner as above by mixing 430 parts of the silicone resin (SR 2410: trademark, manufactured by Toray.Dow Corning Silicone Co., Ltd.; solid content 23%), instead of silicone varnish, and 12 parts of diphenylthiourea and 6 parts of copper methacryloyloxyethylphthalate, and homogeneously dissolving the mixture in 30 parts of methyl ethyl ketone. This composition was applied to a substrate in the same manner as above to obtain a transparent, heat shield film with a light green color.

The films exhibited superior heat shielding properties, with percent of transmission for daylight of 64% and 63%, and that for solar radiation of 45% and 42%, respectively.

No peeling of the hard-coat layer was observed after immersion of these heat shield films in methanol, acetone, benzene, or ethyl acetate for 3 days. Also, no change was observed in the heat shielding characteristics.

Example 2

Twelve parts of 1,3-di-m-chlorophenylthiourea and 6 parts of copper methacryloyloxyethylphthalate were dissolved in 330 parts of a silicone hard-coating agent (Si801A: trademark, manufactured by Daihachi Chemical Co., Ltd.; solid content 30%) to obtain a heat-absorbing hard-coating material. This materials as applied to a substrate of a 70 $\mu m$ polyester film using a Mayer bar and the solvent was volatilized at room temperature. After setting, the material was heat-cured by heating for two minutes in an oven at 150° C., to obtain a transparent heat shield film with a light green color. The amount of the composition applied to the substrate was 8 gm/m$^2$.

Another transparent heat shield film with a light green color was obtained by processing in the same manner as above by using 8 parts of copper n-butyl-o- phthalate instead of 6 parts of copper methacryloyloxyethylphthalate.

Percentage transmission for daylight and that for solar radiation were measured on these films by the same method as in Example 1. They exhibited superior heat shielding properties, with percentage transmission for daylight of 63% and 62%, and that for solar radiation of 47% and 42%, respectively. In addition, no peeling of the hard-coat layer was observed after immersion of the heat shield films in methanol, acetone, benzene, or ethyl acetate for 3 days. No change was observed in the heat shielding characteristics.

The films were irradiated by ultraviolet light continuously for 500 hours by means of a ultraviolet whether meter, whereupon the percentage transmission for solar radiation was again measured. The films were found to retain superior the heat shielding performance stability, with the percentage transmission for solar radiation being 50% and 46%, respectively.

Example 3

Twenty four parts of 1,3-di-m-chlorophenylthiourea and 12 parts of copper methacryloyloxyethylphthalate were dissolved in 476 parts of the same silicone varnish (Tosguard 510) as used in Example 1 to obtain a heat-absorbing hard-coating composition. A PMMA plate and a polycarbonate plate, each of 2 mm thickness, were immersed in the heat-absorbing hard-coating composition to apply this composition to both sides, followed by evaporation of the solvent at room temperature. After setting, the composition was heat-cured by heating for 2 minutes in an oven at 150° C., to obtain a heat shielding PMMA plate and a heat shielding polycarbonate plate, both transparent and colored in light green. The amount of the composition adhered to the plates was 6 gm/m$^2$.

A composition was prepared in the same manner as above by mixing 400 parts of silicone resin (SR 2420: trademark, manufactured by Toray.Dow Corning Silicone Co., Ltd.; solid content 23%), instead of 476 parts of silicone varnish, and 10 parts of 1-benzyl-3-m-tolyl-thiourea and 15 parts of copper monobenzyl-o-phthalate, and homogeneously dissolving the mixture in 30 parts of methyl ethyl ketone. This composition was applied to PMMA and polycarbonate plates in the same manner as above to obtain heat-shield plates.

Percentage transmission for daylight and that for solar radiation were measured on these plates by the same method as in Example 1. Superior heat shielding properties were observed in all plates; the PMMA plates had percentage of transmission for daylight of 70% and 73%, and that for solar radiation of 58% and 56%, respectively, whereas the polycarbonate plates had percentage of transmission for daylight of 69% and 67%, and that for solar radiation of 40% and 39%, respectively. In addition, no peeling of the hard-coat layer was observed after immersion of these plates in methanol, acetone, benzene, or ethyl acetate for three days. No change was observed in the heat shielding characteristics. Also, little change in percentage of transmission for solar radiation was resulted from the irradiation of these plates to ultraviolet light for 500 hours in the same manner as in Example 1.

Comparative Example 1

Twelve parts of copper methacryloyloxyethylphthalate was dissolved in 470 parts of the same silicone varnish as used in Example 1 to obtain a comparative hard-coating composition. The composition was applied to a 70 μm polyester film in the same manner as in Example 1 to provide a hard-coat layer, thus obtaining a transparent blue film. The film had percent transmission for daylight of 65%, but that for solar radiation was 63%, indicating that it has substantially no heat shielding characteristics.

Comparative Example 2

Twelve parts of diphenylthiourea were dissolved in 470 parts of the same silicone varnish as used in Example 1 to obtain a comparative hard-coating composition. The composition was applied to a 70 μm polyester film in the same manner as in Example 1 to provide a hard-coat layer, thus obtaining a colorless transparent film. The film had percent transmission for daylight of 90%, but that for solar radiation was 85%, indicating that it has substantially no heat shielding characteristics.

Hard-coating compositions were prepared in the same manner as Comparative Examples 1 and 2 by using the same silicone resin as used in Example 2, instead of the silicone varnish, and individually incorporating copper monobenzyl-o-phthalate or diphenylthiourea. The tests carried out on the same films as used in Comparative Examples 1 and 2 gave the same results as these Comparative Examples.

Comparative Example 3

A film was obtained in the same manner as in Example 2 by using a composition prepared by dissolving 3 parts of a near-infrared absorbing pigment, IRG002 (trademark, Nippon Kayaku Co., Ltd.), having a chemical formula shown below, in 400 parts of a silicone hard-coating agent (Si Oligomer 2: trademark, manufactured by Daihachi Chemical Co., Ltd.; solid content 25%).

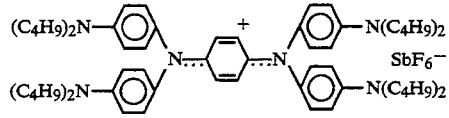

The film was exposed to irradiation by ultraviolet light in the same way as in Example 2. It had percent transmission for solar radiation of 85%, proving that the film has lost substantial near-infrared absorption capability.

As illustrated above, according to the present invention a heat-absorbing hard-coating composition can be prepared more inexpensively than conventional near-infrared absorbing agents from a thiourea derivative compound and a copper salt of organic acid, both industrially manufactured. The incorporation of the near-infrared absorbing compound into a hard-coat layer simultaneously with the forming of the hard-coat layer using heat in the curing process of polysiloxane according to the present invention ensures cheeper and simpler manufacturing of heat shield substances than conventional methods. Thus, the heat-shielding substance of the present invention can find its application with great advantage, for example, in a large-scale structure such as a car port. In addition, it is possible to provide a heat-absorbing shield which is surface-processed to a high degree of hardness on any type of substrate. Therefore, any molded articles with a complicated shape can be processed to form heat-absorbing layers, as required after molding. Furthermore, according to the present invention heat energy can be shut out and confined in the surface of the substrate by the provision of heat-absorbing capability in the heat resistant hard-coat layer. This ensured a remarkable heat-shielding effect even to a substrate with small heat resistance.

Obviously, numerous modifications and variations of the present invention are possible in light of the above teachings. It is therefore to be understood that within the scope of the appended claims, the invention may be practiced otherwise than as specifically described herein.

What is claimed is:

1. A composition which upon curing provides a transparent, hard-coating, heat-absorbing composition consisting essentially of:
   a polymerizable polysiloxane condensation product represented by the following formula $(R_aSiO)_n$ wherein R is a substituted or unsubstituted monovalent hydrocarbon group, $a$ is a number from 1.90 to 2.05 and n has a value such that the polysiloxane is a hard-coating material,
   a derivative of thiourea represented by the following formula (1), $$R_1-NH-CS-NH-R_2 \qquad (1)$$

wherein $R_1$ and $R_2$ independently represent hydrogen, an alkyl group, aryl group, aralkyl group, alkenyl group, or a 5- or 6-membered cyclic residual group, having 1-22 carbon atoms, wherein each group may have one or more substitute groups selected from alkyl, aryl, aralkyl, and alkenyl groups having 1-10 carbon atoms, nitro group, halogen, hydroxyl group, and amino group, and
      a copper salt of an organic acid, said derivative of thiourea and copper salt being present in an amount of from 5 to 50 parts by weight, based on 100 parts by weight of solid polysiloxane, and wherein the mole ratio of copper salt derivative of thiourea is from about 1:3 to 1:5.

2. The composition according to claim 1, wherein said copper salt of an organic acid is a copper salt of o-phthalic acid monoester.

3. A heat-shielding substance consisting essentially of a substrate and a transparent heat-absorbing, hard-coating layer which is formed on the substrate by applying and curing with heat a composition comprising:
   polysiloxane polysiloxane condensation product represented by the following formula $$(R_aSiO)_n$$

wherein R is a substituted or unsubstituted monovalent hydrocarbon group, $a$ is a number from 1.90 to 2.05 and n has a value such that the polysiloxane is a hard-coating material,
   a derivative of thiourea represented by the following formula (1), $$R_1-NH-CS-NH-R_2 \qquad (1)$$

wherein $R_1$ and $R_2$ independently represent hydrogen, an alkyl group, aryl group, aralkyl group, alkenyl group, or a 5- or 6-membered cyclic residual group, having 1-22 carbon atoms, wherein each group may have one or more substitute groups selected from alkyl, aryl, aralkyl, and alkenyl groups having 1-10 carbon atoms, nitro group, halogen, hydroxyl group, and amino group, and, said derivative of thiourea and copper salt being present in an amount of from 5-50 parts by weight, based on 100 parts by weight of solid polysiloxane, and wherein the mole ratio of copper salt derivative of thiourea is from about 1:3 to 1:5.

4. A heat-shielding substance according to in claim 3, wherein said substrate is an synthetic organic polymer or copolymer.

5. A heat-shielding substance consisting essentially of a substrate, a metal layer formed by vacuum evaporation of a metal on the surface of said substrate, and a transparent heat-absorbing, hard-coating layer formed on the top of said metal layer by applying and curing with heat a composition comprising:
   polymerizable polysiloxane condensation product represented by the following formula $$(R_aSiO)_n$$

wherein R is a substituted or unsubstituted monovalent hydrocarbon group, $a$ is a number from 1.90 to 2.05 and n has a value such that the polysiloxane is a hard-coating material,
   a derivative of thiourea represented by the following formula (1), $$R_1-NH-CS-NH-R_2 \qquad (1)$$

wherein $R_1$ and $R_2$ independently represent hydrogen, an alkyl group, aryl group, aralkyl group, alkenyl group, or 5- or 6-membered cyclic residual group, having 1-22 carbon atoms, wherein each group may have one or more substitute groups selected from alkyl, aryl, aralkyl, and alkenyl groups having 1-10 carbon atoms, nitro group, halogen, hydroxyl group, and amino group, and
      a copper salt of an organic acid, said derivative of thiourea and copper salt being present in an amount of from 5 to 50 parts by weight, based on 100 parts by weight of solid polysiloxane, and wherein the mole ratio of copper salt derivative of thiourea is from about 1:3 to 1:5.

6. A composition which upon curing provides a hard-coating heat-absorbing composition consisting essentially of:
   a solution in which a polymerizable polysiloxane condensation product represented by the following formula $$R_aSiO)_n$$

wherein R is a substitute or unsubstituted monovalent hydrocarbon group, $a$ is a number from 1.90 to 2.05 and n has a value such that the polysiloxane is a hard-coating material, and a derivative of thiourea represented by the following formula (1), $$R_1-NH-CS-NH-R_2 \qquad (1)$$

wherein $R_1$ and $R_2$ independently represent hydrogen, an alkyl group, aryl group, aralkyl group, alkenyl group, or a 5- or 6-membered cyclic residual group, having 1-22 carbon atoms, wherein each group may have one or more substitute groups selected from alkyl, aryl, aralkyl, and alkenyl groups having 1-10 carbon atoms, nitro group, halogen, hydroxyl group, and amino group, are homogeneously dissolved, and
      a solution in which polysiloxane and a copper salt of an organic acid are homogeneously dissolved, said derivative of thiourea and copper salt being present in an amount of from 5 to 50 parts by weight, based on 100 parts by weight of solid polysiloxane, and wherein the mole ratio of copper salt derivative of thiourea is from about 1:3 to 1:5.

7. A heat-shielding substance comprising a substrate and a heat-absorbing hard-coating layer which is formed on the surface of said substrate by applying solutions (A) and (B), defined in claim 6, curing with heat to form the heat-absorbing hard-coating layer in the interface of said solutions (A) and (B).

* * * * *